(12) United States Patent
Kinno et al.

(10) Patent No.: US 10,762,486 B2
(45) Date of Patent: Sep. 1, 2020

(54) INFORMATION PROCESSING APPARATUS, INFORMATION PROCESSING METHOD, AND NON-TRANSITORY STORAGE MEDIUM

(71) Applicant: NEC Corporation, Tokyo (JP)

(72) Inventors: Dai Kinno, Tokyo (JP); Kota Iwamoto, Tokyo (JP); Shinichi Matsumoto, Tokyo (JP); Yoshihiro Itou, Tokyo (JP); Shinya Yamasaki, Tokyo (JP); Kanako Taga, Tokyo (JP)

(73) Assignee: NEC Corporation, Tokyo (JP)

( * ) Notice: Subject to any disclaimer, the term of this patent is extended or adjusted under 35 U.S.C. 154(b) by 102 days.

(21) Appl. No.: 16/070,891

(22) PCT Filed: Dec. 13, 2016

(86) PCT No.: PCT/JP2016/086989
§ 371 (c)(1),
(2) Date: Jul. 18, 2018

(87) PCT Pub. No.: WO2017/126253
PCT Pub. Date: Jul. 27, 2017

(65) Prior Publication Data
US 2019/0019173 A1 Jan. 17, 2019

(30) Foreign Application Priority Data
Jan. 21, 2016 (JP) .................................. 2016-009601

(51) Int. Cl.
*G06Q 20/20* (2012.01)
*G07G 1/00* (2006.01)
*G07G 1/01* (2006.01)
*G06K 9/00* (2006.01)
*G06F 16/532* (2019.01)
*G06K 9/46* (2006.01)
*G06T 1/00* (2006.01)

(52) U.S. Cl.
CPC ......... *G06Q 20/208* (2013.01); *G06F 16/532* (2019.01); *G06K 9/00771* (2013.01);
(Continued)

(58) Field of Classification Search
CPC .......... G07G 1/00; G07G 1/01; G07G 1/0063; G06F 16/532; G06K 9/46; G06K 9/00771;
(Continued)

(56) References Cited

U.S. PATENT DOCUMENTS

2009/0322706 A1 12/2009 Austin
2012/0047040 A1 2/2012 Ueda et al.
(Continued)

FOREIGN PATENT DOCUMENTS

EP 2669862 A2 12/2013
EP 3118793 A1 1/2017
(Continued)

OTHER PUBLICATIONS

International Search Report corresponding to PCT/JP2016/086989, 2 pages, dated Mar. 21, 2017.

*Primary Examiner* — Brenda C Bernardi
(74) *Attorney, Agent, or Firm* — Wilmer Cutler Pickering Hale and Dorr LLP

(57) ABSTRACT

There is provided a checkout apparatus (10) including an image data acquisition unit (11) which acquires data on an image, an image analysis unit (12) which recognizes a product in the image, using a feature value of appearance of each of a plurality of products registered in a feature value storage unit (14) and the image data; a registration unit (13) which registers the product recognized by the image analysis unit (12) as a checkout target, and a projection unit (15) which projects an image related to a checkout process on the product and/or a placement surface of a placement platform of the product.

20 Claims, 15 Drawing Sheets

(52) U.S. Cl.
CPC .............. *G06K 9/46* (2013.01); *G06T 1/0007* (2013.01); *G07G 1/00* (2013.01); *G07G 1/0063* (2013.01); *G07G 1/01* (2013.01); *G06K 2209/17* (2013.01)

(58) Field of Classification Search
CPC . G06K 2209/17; G06T 1/0007; G06Q 20/208
See application file for complete search history.

(56) References Cited

U.S. PATENT DOCUMENTS

| | | | |
|---|---|---|---|
| 2013/0320084 | A1 | 12/2013 | Amada et al. |
| 2014/0052555 | A1* | 2/2014 | MacIntosh ........... G07G 1/0036 705/23 |
| 2014/0126775 | A1 | 5/2014 | Kakino |
| 2015/0310601 | A1* | 10/2015 | Rodriguez ............. G06K 9/209 348/150 |
| 2017/0017944 | A1 | 1/2017 | Sasahara |

FOREIGN PATENT DOCUMENTS

| | | |
|---|---|---|
| JP | H07-320146 A | 12/1995 |
| JP | 2004-127013 A | 4/2004 |
| JP | 2012-043371 A | 3/2012 |
| JP | 2013-054673 A | 3/2013 |
| JP | 2013-175890 A | 9/2013 |
| JP | 2014-095983 A | 5/2014 |

\* cited by examiner

FIG. 4

| PRODUCT ID | FEATURE VALUE |
|---|---|
| ⋮ | ⋮ |

FIG. 5

| PRODUCT ID | PRODUCT NAME | PRICE | · · · |
|---|---|---|---|
| ⋮ | ⋮ | ⋮ | ⋮ |

FIG. 15

| No. | PRODUCT NAME | UNIT PRICE | QUANTITY | TOTAL AMOUNT |
|---|---|---|---|---|
| 1 | BANANA | 127 | 1 | 127 |
| 2 | | | | |
| 3 | | | | |
| | | | | |

PRODUCT DETAILS

STOP (CANCEL)    CHECKOUT (PAYMENT)

TENDERED    TAX AMOUNT

CHANGE    TOTAL

~20

INFORMATION PROCESSING APPARATUS, INFORMATION PROCESSING METHOD, AND NON-TRANSITORY STORAGE MEDIUM

CROSS-REFERENCE TO RELATED APPLICATIONS

This application is a national stage application of International Application No. PCT/JP2016/086989 entitled "INFORMATION PROCESSING APPARATUS, INFORMATION PROCESSING METHOD, AND PROGRAM," filed on Dec. 13, 2016, which claims the benefit of the priority of Japanese Patent Application No. 2016-009601 filed on Jan. 21, 2016, the disclosures of each of which are hereby incorporated by reference in their entirety.

TECHNICAL FIELD

The present invention relates to a technique for improving the efficiency of product registration work.

BACKGROUND ART

Cash registers (for example: point of sale (POS) registers) are widely used at convenience stores, supermarkets, other stores, or the like. The registration work of target products to a cash register in checkout is made by a predetermined reader reading a product code attached to each product or by operating an operation object (an operation button, a touch panel display apparatus, or the like) provided in the cash register. There is a need for a technique that can improve the efficiency of the registration work. Related arts are disclosed in Patent Documents 1 to 3.

Patent Document 1 discloses an information processing apparatus including a first imaging unit, a recognition unit, and a determination unit. The first imaging unit images the placement surface of the placement platform on which an object is placed, from a plurality of different imaging directions. The recognition unit reads from each of the first captured images captured by the first imaging unit from the respective plurality of imaging directions, the feature value of a target image representing the object included in the first captured image and compares the read feature value with the feature value of each object stored in advance, thereby recognizing the object corresponding to the target image for each first captured image. The determination unit determines the recognition result of the object placed on the placement platform, based on the recognition result of the target image for each first captured image. In the present invention, various types of information are output through a display apparatus or a printer.

Patent Document 2 discloses a product reading apparatus including a display unit, a frame line display unit, a correction receiving unit, a frame line correction unit, a product recognition unit, and an output unit. The display unit displays the image captured by an imaging unit. The frame line display unit displays a frame line for enclosing the product included in the image, on the image displayed on the display unit. The correction receiving unit receives an instruction to correct the frame line. The frame line correction unit corrects the frame line on the screen according to the correction instruction. The product recognition unit recognizes the product included in the image within the frame line. The output unit outputs information on the product recognized by the product recognition unit. Even in the present invention, various types of information are output through a display apparatus or a printer.

Patent Document 3 discloses an apparatus including a belt conveyor that conveys a product, a start button to start an operation, a display apparatus that instructs work, a height measuring apparatus that measures the height of the product, an imaging apparatus that images the product, a first counter that counts the product when the height measuring apparatus and the imaging apparatus detect the product, a barcode scanner that varies the focal distance and the like and reads and decodes a barcode from the product passing through, a second counter that counts the number of products subjected to a registration process, and a POS terminal that processes the image from the imaging apparatus to determine the position, size, or the like of the product, performs a registration process based on the product data of the scanner, and after the operation of the end button, determines that registration is completed when the count values of the first and second counters match. Even in the present invention, various types of information are output through a display apparatus or a printer.

RELATED DOCUMENT

Patent Document

[Patent Document 1] Japanese Patent Application Publication No. 2013-54673
[Patent Document 2] Japanese Patent Application Publication No. 2013-175890
[Patent Document 3] Japanese Patent Application Publication No. 7-320146

SUMMARY OF THE INVENTION

Technical Problem

As disclosed in Patent Documents 1 to 3, efficiency of registration work is expected to be improved by registering products by using the image recognition technique.

However, the present inventors have newly found the following problems in the technique of registering products using the image recognition technique. In a case of conducting the registration work using the technique, it is considered that the worker is mainly facing toward the placement platform on which the product is placed, during the registration work. As work to be performed by an worker, for example, work of arranging a plurality of products on the placement platform so that products do not overlap each other (to image each product), work of adjusting the way (orientation or the like) of placing each product so that a characteristic portion of the product is imaged, or the like is considered.

Under such circumstances, in a case where various types of information are output only through a display apparatus provided in a cash register, the worker has to repeatedly alternately view the placement platform and the display apparatus during the registration work. As a result, the efficiency of registration work may be reduced.

The present invention provides a technique for improving the efficiency of product registration work.

Solution to Problem

According to the present invention, there is an information processing apparatus including an image data acquisition unit which acquires data on an image; an image analysis unit which recognizes a product in the image, using a feature value of appearance of each of a plurality of products registered in a feature value storage unit and the data on the image; a registration unit which registers the product recognized by the image analysis unit as a checkout target; and a projection unit which projects an image related to a checkout process, on the product and/or a placement surface of a placement platform for the product.

Further, according to the present invention, there is provided an information processing method executed by a computer, the method including an image data acquisition step of acquiring data on an image; an image analysis step of recognizing a product in the image, using a feature value of appearance of each of a plurality of products registered in a feature value storage unit and the data on the image; a registration step of registering the product recognized in the image analysis step as a checkout target; and a projection step of projecting an image related to a checkout process, on the product and/or a placement surface of a placement platform for the product.

Further, according to the present invention, there is provided a program causing a computer to function as: an image data acquisition unit which acquires data on an image; an image analysis unit which recognizes a product in the image, using a feature value of appearance of each of a plurality of products registered in a feature value storage unit and the data on the image; a registration unit which registers the product recognized by the image analysis unit as a checkout target; and a projection unit which projects an image related to a checkout process on the product and/or a placement surface of a placement platform for the product.

Advantageous Effects of Invention

According to the present invention, product registration work can be made more efficient.

BRIEF DESCRIPTION OF THE DRAWINGS

The foregoing and other objects, features and advantages will become more apparent from the following description of preferred example embodiments and the accompanying drawings.

FIG. 4 is a diagram schematically showing an example of information registered in a feature value storage unit of the present example embodiment.

FIG. 5 is a diagram schematically showing an example of information registered in a product information storage unit of the present example embodiment.

FIG. 15 is a diagram schematically showing an example of information displayed on a display apparatus by the checkout apparatus of the present example embodiment.

DESCRIPTION OF EMBODIMENTS

First, an example of a hardware configuration of a checkout apparatus (information processing apparatus) of the present example embodiment (first to fifth example embodiments) will be described. Each functional configuration unit of the checkout apparatus may be realized by hardware (for example, a hard-wired electronic circuit) that realizes each functional configuration unit, or a combination of hardware and software (for example, a combination of an electronic circuit, a program for controlling the electronic circuit, and the like).

Figure 1:
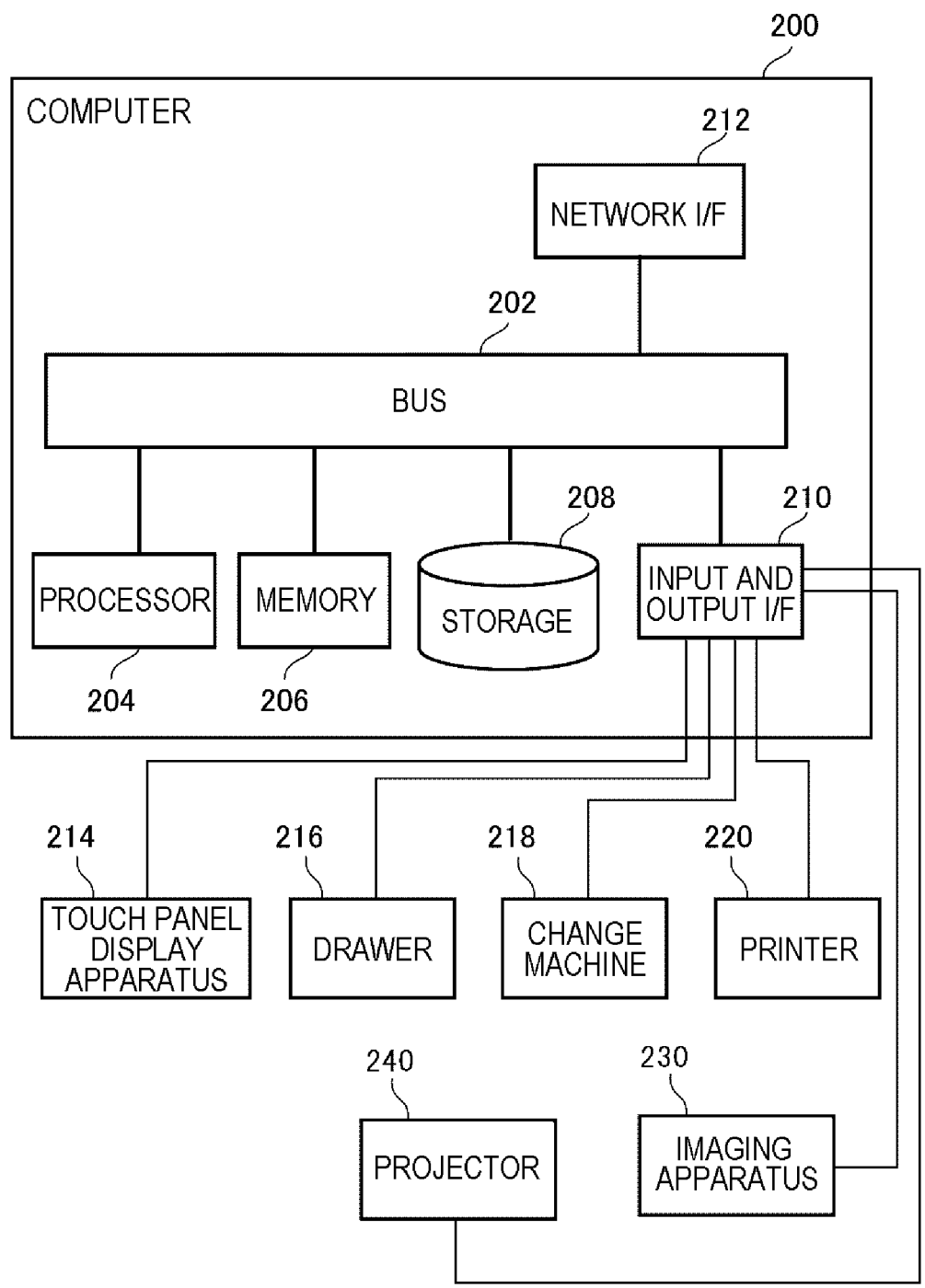
FIG. 1 is a diagram conceptually illustrating an example of a hardware configuration of an apparatus of a present example embodiment.

FIG. 1 is a diagram illustrating a hardware configuration of the checkout apparatus of the present example embodiment. The hardware configuration may be realized using a dedicated apparatus designed for cash register terminal or may be realized using a general-purpose apparatus such as a personal computer (PC) or a portable terminal.

The computer 200 includes a bus 202, a processor 204, a memory 206, a storage 208, an input and output interface 210, and a network interface 212. The bus 202 is a data transmission path through which the processor 204, the memory 206, the storage 208, the input and output interface 210, and the network interface 212 mutually transmit and receive data. However, a method of connecting the processor 204 and the like to each other is not limited to bus connection. The processor 204 is an arithmetic processing device such as a central processing unit (CPU) or a graphics processing unit (GPU). The memory 206 is a memory such as a random access memory (RAM) or a read only memory (ROM). The storage 208 is a storage apparatus such as a hard disk, a solid state drive (SSD), or a memory card. Further, the storage 208 may be a memory such as a RAM or a ROM.

The input and output interface 210 is an interface for connecting the computer 200 and an input/output apparatus. For example, a touch panel display apparatus 214, a drawer 216, a change machine 218, a printer 220, an imaging apparatus 230, a projector 240, and the like are connected to the input and output interface 210. The touch panel display apparatus 214 is used, for example, to manually input the amount of money of a product. Further, the touch panel display apparatus 214 displays various types of information, such as information on a product registered as a checkout target. The drawer 216 stores coins and bills. The change machine 218 has an input port for inputting the money and an output port for discharging the change. The printer 220 issues a receipt or the like. The imaging apparatus 230 captures a still image and/or a moving image. The projector 240 projects a predetermined image. An input interface other than the touch panel display apparatus 214, such as a keyboard, may be connected to the computer 200.

The network interface 212 is an interface for communicably connecting the computer 200 to an external apparatus. The network interface 212 may be a network interface for connection with a wired line, or a network interface for connection with a wireless line. For example, the computer 200 that realizes the checkout apparatus is connected to a store server or the like that manages various apparatuses installed in the store through the network.

The storage 208 stores a program module for implementing each function (each functional unit) of the checkout apparatus. By executing these respective program modules, the processor 204 implements the functions corresponding to the program modules. Here, when executing the above modules, the processor 204 may execute the modules after loading them into the memory 206, or may execute the modules without loading them into the memory 206.

The hardware configuration of the checkout apparatus is not limited to the configuration illustrated in FIG. 1. For example, each program module may be stored in the memory 206. In this case, the computer 200 may not include the storage 208. In addition, the computer 200 does not necessarily need to be communicably connected to other apparatuses through a network. Therefore, the computer 200 may not include the network interface 212. Further, in a case where the checkout apparatus is not used for a payment process, the checkout apparatus may not include the drawer 216, the change machine 218, and the printer 220. In addition, the checkout apparatus only needs to acquire the image captured by the imaging apparatus 230, and the checkout apparatus may not include the imaging apparatus 230 itself. In this case, the checkout apparatus is configured in a communicable manner with the imaging apparatus 230, and acquires image data from the imaging apparatus 230.

Hereinafter, the present example embodiment will be described. It should be noted that, the functional block diagram used in the description of the following exemplary example embodiment shows blocks of functional units rather than a configuration of a hardware unit. These drawings show that each apparatus is configured by a single apparatus, but a configuration means thereof is not limited to this. That is, it may be a physically separated configuration or a logically divided configuration. Note that, the same reference numerals may be attached to the same configuration components, and the description thereof will be omitted as appropriate.

First Example Embodiment

First, an outline of the checkout apparatus of the present example embodiment will be described. The checkout apparatus of the present example embodiment may perform product registration using an image recognition technique. In other words, the checkout apparatus analyzes the data of an image captured so as to include the placement surface of the placement platform on which the product to be checked out is placed, and recognizes one or a plurality of products captured in the image. In the recognition, the feature of the appearance of each product is used. Then, the checkout apparatus registers the one or plurality of recognized products as products to be checked out.

Further, the checkout apparatus can project a predetermined image on the placement surface of the placement platform and/or the product. The image to be projected includes information on the checkout process and is configured in various forms such as letters, numbers, symbols, figures, and the like. Further, the image may be composed of many colors. Further, the image may be a still image or a moving image. Note that, a specific example of information on the checkout process is illustrated in the following example embodiment.

In the case of the checkout apparatus of the present example embodiment, the worker who performs the registration work can view images related to the checkout process projected on the placement surface of the placement platform or on the product, while performing predetermined work on the product placed on the placement platform (for example, work of arranging a plurality of products on the placement platform so that products do not overlap each other, and work of adjusting the way (orientation or the like) of placing each product so that a characteristic portion of the product is imaged). As a result, the efficiency of the registration work is improved as compared with the case of repeatedly alternately viewing the placement platform and the display apparatus. Further, oversight of information output from the checkout apparatus can be reduced.

Next, an application example of the checkout apparatus of the present example embodiment will be described with reference to FIG. 2. The checkout apparatus includes a registration apparatus 1, a processing apparatus 4, and a projection apparatus 7. The checkout apparatus may further include an imaging apparatus 3. Note that, in FIG. 2, the registration apparatus 1 and the processing apparatus 4 are described separately, but these apparatuses may be integrated physically and/or logically. In addition, although the imaging apparatus 3, the processing apparatus 4, and the projection apparatus 7 are described separately, at least a part of these apparatuses may be integrated physically and/or logically.

The hardware configuration of FIG. 1 shows an example in which the registration apparatus 1 and the processing apparatus 4 are logically integrated. The registration apparatus 1 and the processing apparatus 4 each include the computer 200 illustrated in FIG. 1. The registration apparatus 1 includes a touch panel display apparatus 214, a drawer 216, a change machine 218, and a printer 220 illustrated in FIG. 1. Then, the projection apparatus 7 includes a projector 240 illustrated in FIG. 1. Then, the imaging apparatus 3 corresponds to the imaging apparatus 230 illustrated in FIG. 1.

The imaging apparatus 3 and the projection apparatus 7 are connected to the processing apparatus 4 and are capable of communicating. Further, the registration apparatus 1 is connected to the processing apparatus 4 and is capable of communicating. The communication standard is a design matter. Communication may be performed in a wired or wireless manner.

The imaging apparatus 3 has a function of imaging a moving image and/or a still image. The imaging apparatus 3 may continuously capture moving image data. In addition, the imaging apparatus 3 may intermittently (including periodically) capture a still image. In this case, the imaging apparatus 3 can perform imaging at a predetermined timing which is determined in advance (for example, the timing at which an instruction is given from the worker).

For example, the imaging apparatus 3 is installed at a predetermined position so as to capture an image including the placement surface of the placement platform 2. The installation position is a design matter. For example, the imaging apparatus 3 may be installed directly above or obliquely above the placement surface of the placement platform 2, and may capture the placement surface from that direction. In addition, the imaging apparatus 3 may be installed on the placement surface of the placement platform 2 and image the placement surface from the lateral direction. In addition, the placement platform 2 may be formed of a transparent member, and the imaging apparatus 3 may be disposed below the placement platform 2. In this case, the imaging apparatus 3 images the placement surface from the lower side of the placement platform 2.

Next, the projection apparatus 7 projects an image related to the checkout process on the placement surface of the placement platform 2 and/or the product 6. The projection apparatus 7 is installed at a predetermined position where such projection can be realized. The installation position is a design matter. For example, the projection apparatus 7 may be installed directly above or obliquely above the placement surface, and may project an image from that direction. In addition, the projection apparatus 7 may be installed on the placement surface and may project an image from the lateral direction. In addition, the placement platform 2 may be configured to include a transparent member and/or a translucent member having transmittivity, and the projection apparatus 7 may be installed below the placement platform 2. In this case, the projection apparatus 7 projects an image from the lower side of the placement platform 2 on the placement surface of the placement platform 2.

The processing apparatus 4 acquires image data from the imaging apparatus 3. Then, the processing apparatus 4 performs image analysis and recognizes the product 6 included in the image. In this recognition, the features of the appearance of each product 6 are used. Thereafter, the processing apparatus 4 transmits the recognition result to the registration apparatus 1.

Further, the processing apparatus 4 controls the projection apparatus 7. In other words, the processing apparatus 4 transmits to the projection apparatus 7 control information indicating the image to be projected and the position to be projected. According to the control information, the projection apparatus 7 projects a predetermined image on the placement surface of the placement platform 2 or the product 6.

The registration apparatus 1 has a function of registering a product 6 to be checked out. The registration apparatus 1 may have a function of transmitting information on registered contents (for example: product information on the registered product 6, or the like) to the processing apparatus 4.

The illustrated registration apparatus 1 includes a display apparatus 101, a display apparatus 102, a code reader 103, operation buttons 104, and a drawer 105.

The display apparatus 101 faces toward the front side (worker side of product registration) of the placement platform 2, and mainly a worker who performs registration work views the apparatus. Information related to a checkout process, warnings, or the like are displayed on the display apparatus 101. The display apparatus 101 may be a touch panel display apparatus.

The display apparatus 102 faces toward the opposite side (customer side) of the placement platform 2, and mainly a shopper views the apparatus. Information related to a checkout process, advertisements, or the like are displayed on the display apparatus 102. The display apparatus 102 may be a touch panel display apparatus.

The code reader 103 reads the product code (one-dimensional code, two-dimensional code, or the like) attached to each product 6. The plurality of operation buttons 104 respectively correspond to various products, numbers, various functions (for example, subtotal, or the like), and are used for each input. Note that, as described above, in the present example embodiment, product registration can be performed using an image recognition technique.

Therefore, the code reader 103 and the operation button 104 are supplementarily used. The drawer 105 stores money, cash vouchers, and the like.

It should be noted that, the registration apparatus 1 may have at least the function of registering a product 6 to be checked out, and may not include at least a part of the illustrated functions.

Further, although the illustrated registration apparatus 1 is configured on the premise that it is operated by a store clerk, it may be configured on the premise that it is operated by shoppers.

Figure 3:
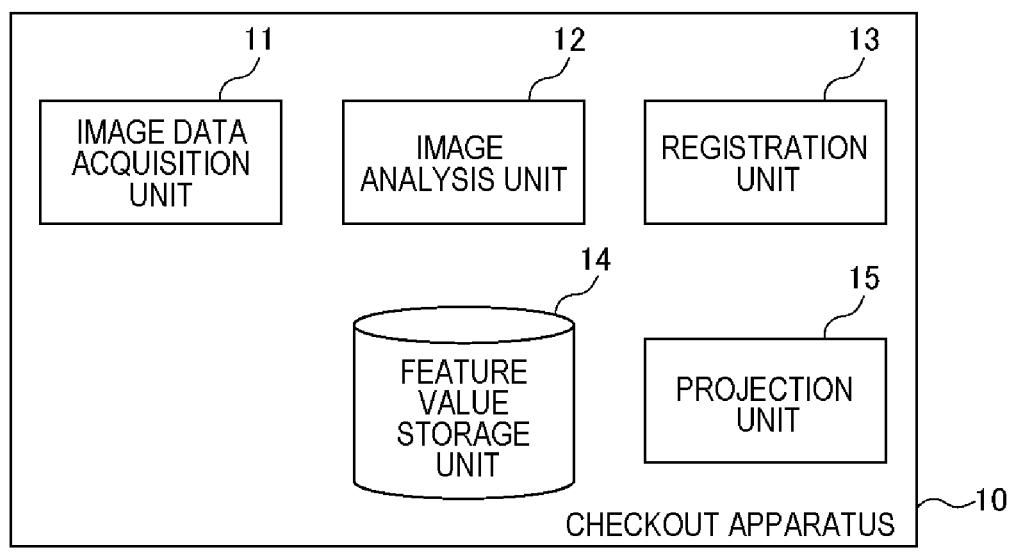
FIG. 3 is an example of a functional block diagram of the checkout apparatus of the present example embodiment.

Next, the configuration of the checkout apparatus of the present example embodiment will be described in detail. FIG. 3 shows an example of a functional block diagram of the checkout apparatus 10 of the present example embodiment. As illustrated in FIG. 3, the checkout apparatus 10 includes an image data acquisition unit 11, an image analysis unit 12, a registration unit 13, a feature value storage unit 14, and a projection unit 15. Note that, the checkout apparatus 10 may not include the feature value storage unit 14. In this case, a different apparatus logically separated from the checkout apparatus 10 is provided with the feature value storage unit 14. The checkout apparatus 10 is configured in a communicable manner with the different apparatus and acquiring the information stored in the feature value storage unit 14.

Figure 2:
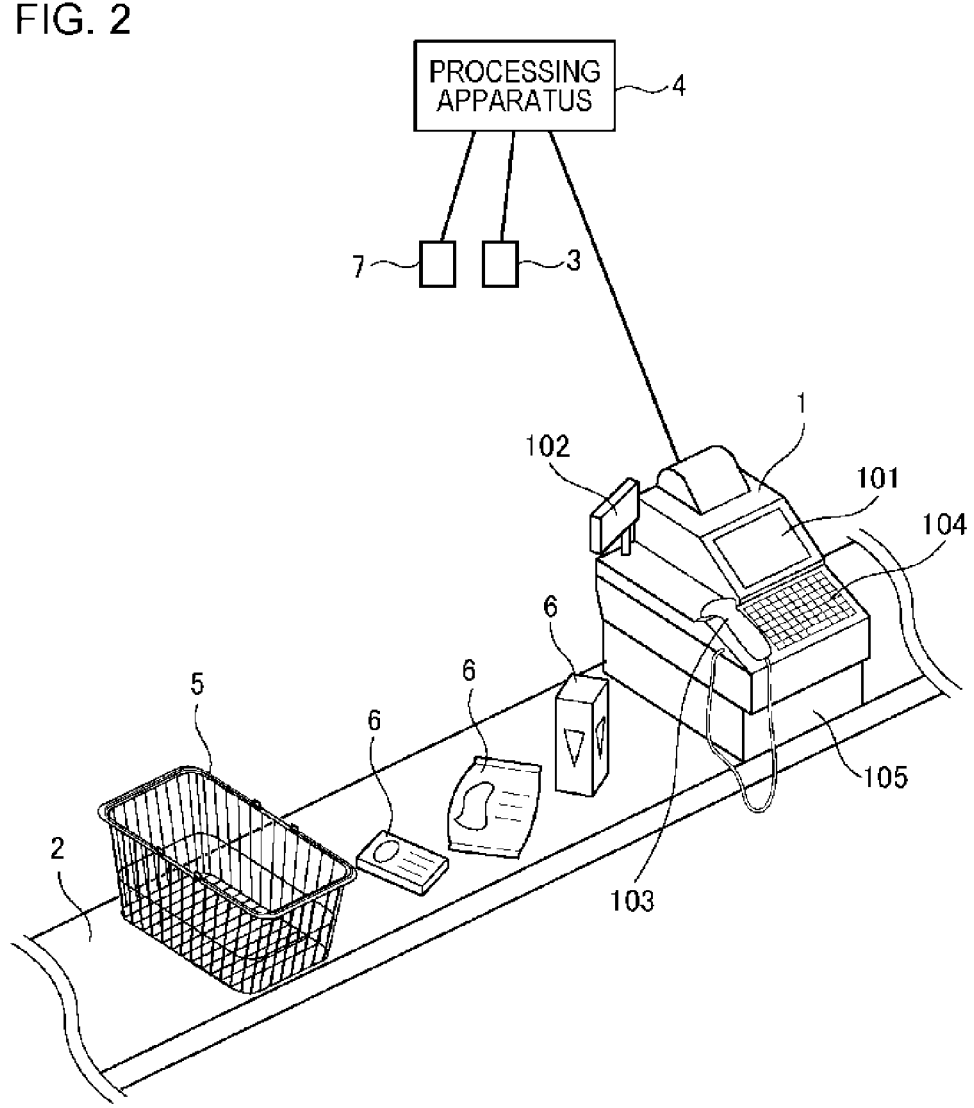
FIG. 2 is a diagram for explaining an application example of a checkout apparatus of the present example embodiment.

As described above, the checkout apparatus 10 includes the registration apparatus 1, the processing apparatus 4 and the projection apparatus 7 illustrated in FIG. 2. The image data acquisition unit 11 is realized by the processing apparatus 4. The image analysis unit 12 is realized by the processing apparatus 4. The registration unit 13 is realized by the registration apparatus 1. The feature value storage unit 14 may be realized by the processing apparatus 4. The projection unit 15 is realized by the processing apparatus 4 and the projection apparatus 7.

The image data acquisition unit 11 acquires data of an image captured so as to include the placement surface of the placement platform on which the product to be checked out is placed. The image data acquisition unit 11 acquires the image data captured by the imaging apparatus 3 described with reference to FIG. 2 in real time.

The image analysis unit 12 recognizes one or a plurality of products captured in the image, using the image data acquired by the image data acquisition unit 11 (recognition process). The image analysis unit 12 performs a recognition process for each frame, and can recognize one or a plurality of products within each frame.

Figure 4:
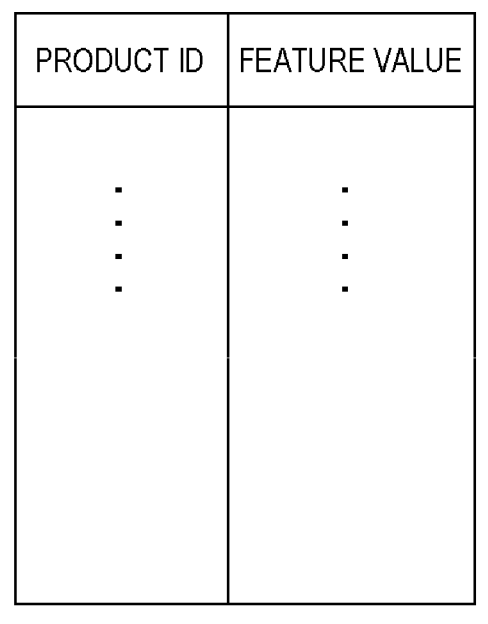

In the recognition process, the image analysis unit 12 uses the feature value storage unit 14 in which the feature value of the appearance of each of a plurality of products is registered in advance. FIG. 4 schematically shows an example of information stored in the feature value storage unit 14. In the illustrated example, a product identifier (ID) for identifying each of a plurality of products is associated with a feature value of appearance of each of the plurality of products. The feature value can be exemplified by shape, color, color distribution, and the like, but is not limited thereto. The feature value storage unit 14 may store the feature value of each of a plurality of pieces of appearance when observed from each of a plurality of directions, corresponding to each product.

The algorithm for product recognition by the image analysis unit 12 using the feature value storage unit 14 and the image data is a design matter and any technique can be adopted. For example, the techniques disclosed in Patent Documents 1 to 3 may be adopted.

Returning to FIG. 3, the registration unit 13 registers the one or plurality of products recognized by the image analysis unit 12 as products to be checked out. For example, the registration unit 13 may perform product registration using a product information storage unit (not illustrated) in which product information of each of a plurality of products is registered in advance.

Figure 5:
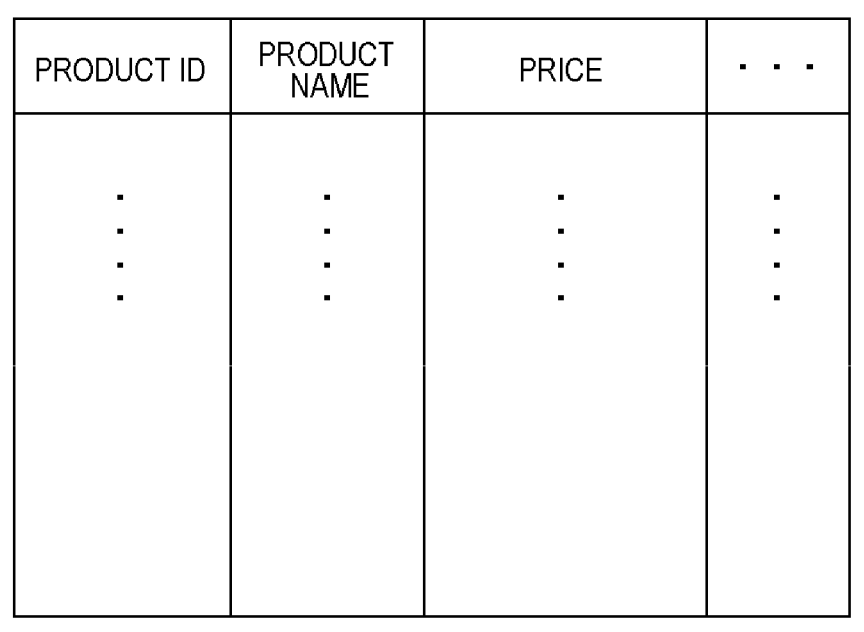

FIG. 5 schematically shows an example of the product information stored in the product information storage unit. In the illustrated product information, the product ID, the name of each product, and the price are associated with each other. Note that, the product information may not have a part of these or may have other types of information.

The checkout apparatus 10 may include such a product information storage unit. In addition, a different apparatus logically separated from the checkout apparatus 10 may be provided with the product information storage unit. In the latter case, the checkout apparatus 10 is configured to communicate with the different apparatus so that the product information stored in the product information storage unit can be acquired.

The registration unit 13 acquires product information (for example: name, price, or the like) of one or a plurality of products recognized by the image analysis unit 12, from the product information storage unit. Then, the registration unit 13 registers the acquired product information. The product information on the registered product is displayed on the registration screen. The registration screen is displayed on the display apparatus 101 or the display apparatus 102 (see FIG. 2). FIG. 15 schematically shows an example of the registration screen 20. In the case of the illustrated example, product information on the registered products is displayed in a list in the column of product details. In the illustrated example, "banana" is registered.

"Registered product" means, for example, the product displayed on the registration screen 20. "Registered product" may further include a product that is not yet displayed on the registration screen 20, but is recognized by the image analysis unit 12, and for which product information is being searched based on the product information storage unit. The premise also applies to the following example embodiments.

Returning to FIG. 3, the projection unit 15 projects an image related to the checkout process on the placement surface and/or the product. The image to be projected is configured in various forms such as letters, numbers, symbols, figures, and the like. Further, the image may be composed of many colors. Further, the image may be a still image or a moving image. The image can contain any information notified to the worker at the time of checkout process.

Next, an example of the process flow of the registration work using the checkout apparatus 10 of the present example embodiment will be described, using the application example of FIG. 2.

First, the shopper browses in the store and puts a product 6 to be purchased in a shopping basket 5. After that, the shopper moves to the location of the illustrated checkout apparatus 10, for a checkout process.

As illustrated, the store clerk who performs the registration operation places the product 6 that is put in the shopping basket 5 at a predetermined position on the placement surface of the placement platform 2. Thus, the product 6 is captured in the captured image captured by the imaging apparatus 3.

The processing apparatus 4 (image data acquisition unit 11) acquires data on an image from the imaging apparatus 3. Thereafter, the processing apparatus 4 (the image analysis unit 12) analyzes the image data and recognizes the product 6 captured in the image. Then, the recognition result is transmitted to the registration apparatus 1. When receiving a recognition result, the registration apparatus 1 (registration unit 13) registers the recognized product 6 as the product 6 to be checked out.

In addition, during such registration work, the processing apparatus 4 and the projection apparatus 7 (projection unit 15) project a predetermined image (information) related to the checkout process on the placement surface of the placement platform 2 or the product 6.

The store clerk views images related to the checkout process projected on the placement surface of the placement platform 2 or on the product 6, while performing predetermined work on the product 6 (for example, work of arranging a plurality of products 6 on the placement platform 2 so that products do not overlap each other, and work of adjusting the way (orientation or the like) of placing each product 6 so that a characteristic portion of the product 6 is imaged). Then, based on the image, the store clerk performs predetermined work as necessary.

When the registration work of all the products 6 to be purchased is completed, the store clerk performs a checkout process, a payment process, or the like by operating the registration apparatus 1.

For example, the store clerk performs a predetermined operation (for example, pressing the "subtotal" button) on the operation button 104 to complete the registration work. Then, the store clerk checks the total purchase amount displayed on the display apparatus 101 and notifies the shopper. Thereafter, the store clerk receives amount tendered or the like from the shopper.

Next, the store clerk performs a predetermined operation on the operation button 104 and inputs the amount tendered which is received or the like. Then, the change amount is displayed on the display apparatus 101, and the drawer 105 is opened. The store clerk stores the amount tendered in the drawer 105 and takes out the change from the drawer 105. Then, the store clerk hands over to the shopper the change taken out.

It should be noted that, the flow of the above-described checkout process, the payment process, or the like is only an example, and the flow varies depending on the configuration of the registration apparatus 1.

The checkout apparatus 10 of the present example embodiment described above can perform product registration using an image recognition technique. In other words, the checkout apparatus 10 analyzes the data of an image captured so as to include the placement surface of the placement platform on which the product to be checked out is placed, and recognizes one or a plurality of products captured in the image. Then, the checkout apparatus 10 registers the one or plurality of recognized products as products to be checked out.

According to the checkout apparatus 10 of the present example embodiment described above, it is possible to register a plurality of products at once. In addition, compared with the case of registering each product by a predetermined reader reading a product code attached to each product or by operating an operation object (an operation button, a touch panel display apparatus, or the like) provided in the cash register, the workload of a worker who performs registration work can be reduced. As a result, the efficiency of product registration work is improved.

Further, the checkout apparatus 10 of the present example embodiment can project a predetermined image on the placement surface of the placement platform and/or the product. The image to be projected includes information on the checkout process and is configured in various forms such as letters, numbers, symbols, figures, and the like.

In the case of the checkout apparatus 10 of the present example embodiment, the worker who performs the registration work can view images related to the checkout process projected on the placement surface of the placement platform or on the product, while performing predetermined work on the product placed on the placement platform (for example, arranging a plurality of products on the placement platform so that products do not overlap each other, and adjusting the way (orientation or the like) of placing each product so that a characteristic portion of the product is imaged). Therefore, it is unnecessary to perform troublesome work such as repeatedly alternately viewing the placement platform and the display apparatus. As a result, the efficiency of product registration work is improved. Further, oversight of information output from the checkout apparatus 10 can be reduced.

Second Example Embodiment

The checkout apparatus 10 according to the present example embodiment may project images (information) related to registration by the registration unit 13 or recognition by the image analysis unit 12 on the placement surface of the placement platform and/or on the product. This will be described in detail below.

An example of the functional block diagram of the checkout apparatus 10 of the present example embodiment is illustrated in FIG. 3 as in the first example embodiment. As illustrated, the checkout apparatus 10 includes an image data acquisition unit 11, an image analysis unit 12, a registration unit 13, a feature value storage unit 14, and a projection unit 15.

It should be noted that, as in the first example embodiment, the checkout apparatus 10 may not include the feature value storage unit 14. The premise in this case is the same as in the first example embodiment. Further, the checkout apparatus 10 may or may not include a product information storage unit, as in the first example embodiment. The premise in the case without the product information storage unit is the same as in the first example embodiment.

The configurations of the image data acquisition unit 11, the feature value storage unit 14, and the product information storage unit are the same as those in the first example embodiment.

The registration unit 13 transmits the information on the registered contents to the projection unit 15. Other configurations of the registration unit 13 are the same as those in the first example embodiment. Hereinafter, an example of information on registration contents transmitted from the registration unit 13 to the projection unit 15 will be described.

As described in the first example embodiment, when acquiring a recognition result (information indicating one or a plurality of recognized products) from the image analysis unit 12, the registration unit 13 acquires product information (see FIG. 5) of the product from the product information storage unit and registers it as a checkout target. Upon completion of the registration, the registration unit 13 may transmit to the projection unit 15 information indicating the registered product (for example: product ID) as information on the registered contents. At this time, the registration unit 13 may further transmit the product information (product name, price, or the like) of the product to the projection unit 15.

In addition, the registration unit 13 may transmit to the projection unit 15 information indicating the number of registered products as information on registered contents.

In addition, in a case where two or more same products are registered, the registration unit 13 may transmit to the projection unit 15 information indicating the fact as information on registered contents. Note that, the information transmitted here includes the product IDs of the two or more registered products.

Returning to FIG. 3, the image analysis unit 12 acquires position information of each of the recognized products. For example, the image analysis unit 12 acquires the coordinates in the image of each of the recognized products. Then, the image analysis unit 12 transmits the position information to the projection unit 15. For example, the image analysis unit 12 transmits to the projection unit 15, the product ID of each of the recognized products in association with the position information of each of the recognized products. Further, the image analysis unit 12 may transmit the position information (the coordinates in the image) of the position where no product is placed to the projection unit 15. Other configurations of the image analysis unit 12 are the same as those in the first example embodiment.

The projection unit 15 projects an image related to registration by the registration unit 13 or recognition by the image analysis unit 12. The projection unit 15 realizes the projection of the image using the information on the registered contents received from the registration unit 13 and the position information of each recognized product received from the image analysis unit 12. Other configurations of the projection unit 15 are the same as those in the first example embodiment.

Figure 6:
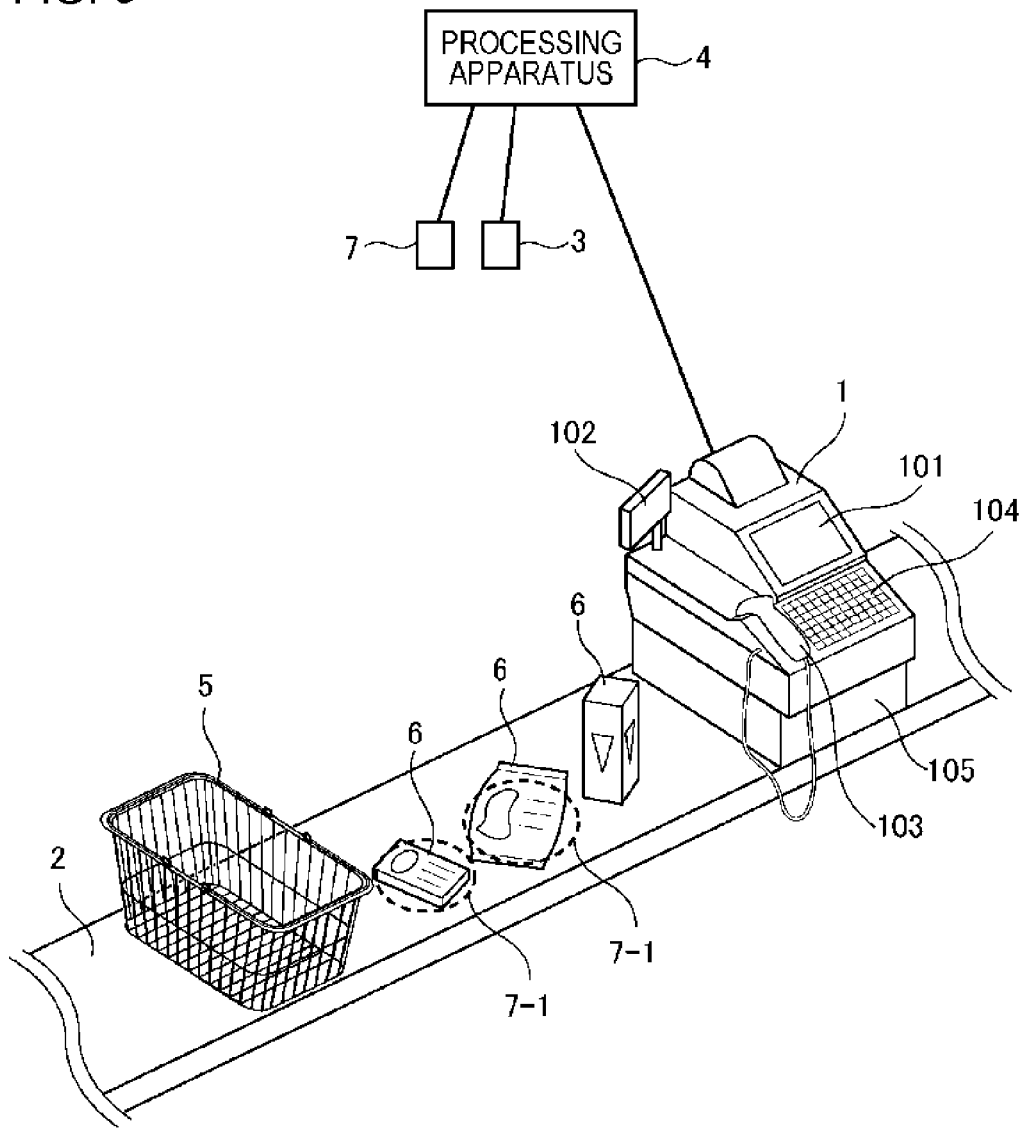
FIG. 6 is a diagram for explaining an example of an image projected by a projection unit of the present example embodiment.

The projection unit 15 projects, for example, an image for specifying the product registered by the registration unit 13. FIG. 6 shows an example of such an image.

In FIG. 6, an image 7-1 of a circle mark is projected corresponding to each registered product 6. The image 7-1 is projected on the placement surface of the placement platform 2 or the product 6, corresponding to each product 6. Note that, the image 7-1 may be anything as long as the worker can identify each registered product 6, and is not limited to the illustrated circle mark.

The projection unit 15 determines a position to project the image 7-1 described above, using the "position information of each recognized product" received from the image analysis unit 12.

For example, the projection unit 15 retains a conversion rule (for example: a conversion expression composed of matrices, or the like) for converting the coordinates in the image into the coordinates in the projection area in advance. Then, based on the conversion rule, the projection unit 15 converts the "coordinates in the image of each recognized product" into the coordinates in the projection area. Then, the projection unit 15 determines the position to project the image 7-1, based on the converted coordinates in the projection area. For example, the projection unit 15 may use the converted coordinate itself in the projection area as the position to project the image 7-1. In addition, the projection unit 15 may use a position (for example: a position a predetermined short distance away therefrom in the right direction) having a predetermined relationship with the converted coordinates in the projection area as the position to project the image 7-1.

In addition, the projection unit 15 may project an image showing product information (product name, price, or the like) corresponding to each product registered by the registration unit 13 (not shown). For example, such an image may be projected around each product on the placement surface.

In addition, the projection unit 15 may project an image for specifying the product recognized by the image analysis unit 12 by using the position information of each of the recognized products received from the image analysis unit 12. An example of such an image is, for example, as illustrated in FIG. 6, similar to the image for specifying the product registered by the registration unit 13.

In FIG. 6, an image 7-1 of a circle mark is projected corresponding to each recognized product 6. The image 7-1 is projected on the placement surface of the placement platform 2 or the product 6, corresponding to each product 6. Note that, the image 7-1 may be anything as long as the worker can identify each recognized product 6, and is not limited to the illustrated circle mark.

The projection unit 15 determines a position to project the image 7-1 described above, using the "position information of each recognized product" received from the image analysis unit 12.

For example, the projection unit 15 retains a conversion rule (for example: a conversion expression composed of matrices, or the like) for converting the coordinates in the image into the coordinates in the projection area in advance. Then, based on the conversion rule, the projection unit 15 converts the "coordinates in the image of each recognized product" into the coordinates in the projection area. Then, the projection unit 15 determines the position to project the image 7-1, based on the converted coordinates in the projection area. For example, the projection unit 15 may use the converted coordinate itself in the projection area as the position to project the image 7-1. In addition, the projection unit 15 may use a position (for example: a position a predetermined short distance away therefrom in the right direction) having a predetermined relationship with the converted coordinates in the projection area as the position to project the image 7-1.

In addition, the projection unit 15 may project an image showing product information (product name, price, or the like) corresponding to each product recognized by the image analysis unit 12 (not illustrated). For example, such an image may be projected around each product on the placement surface.

Figure 7:
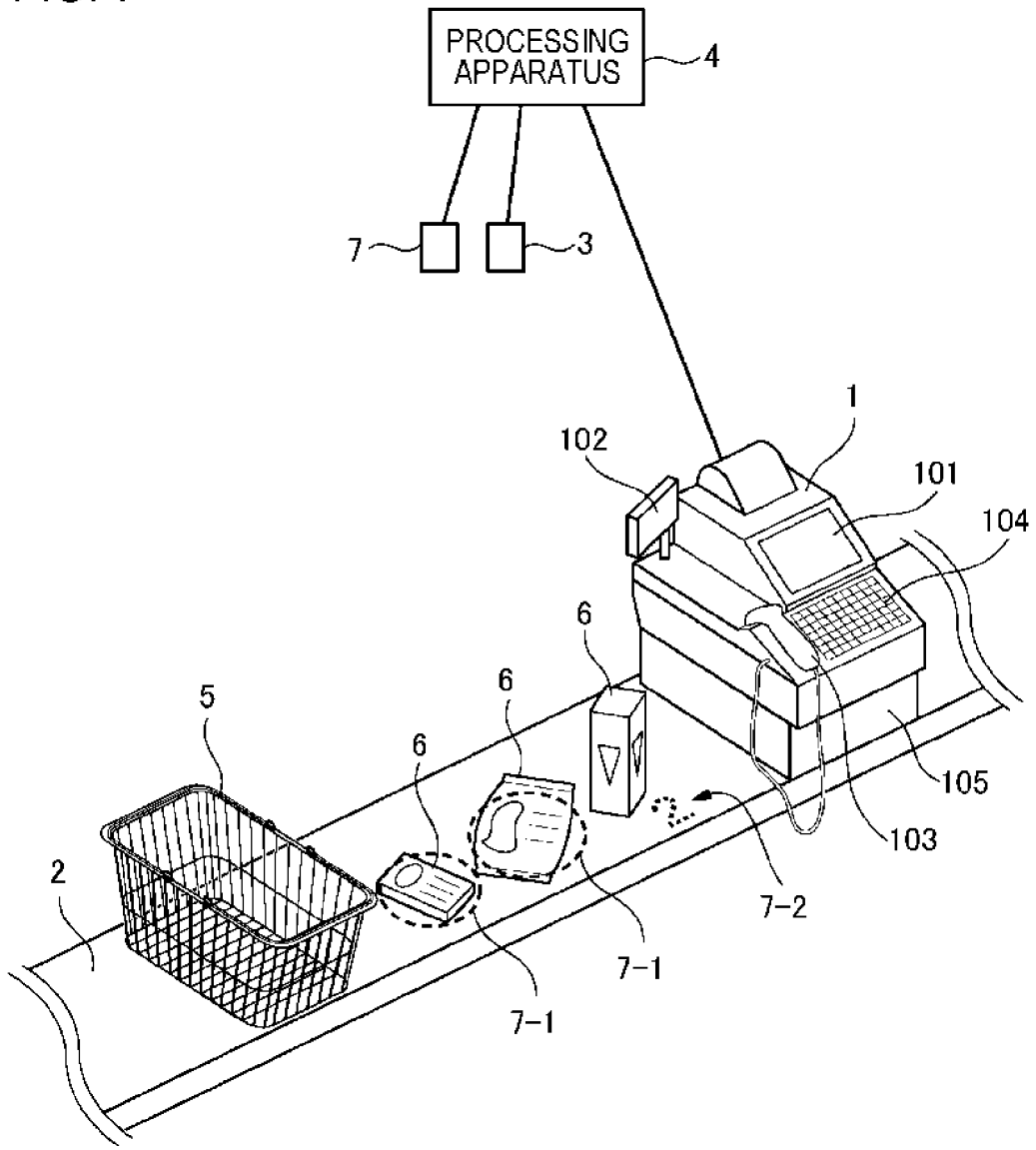
FIG. 7 is a diagram for explaining another example of the image projected by the projection unit of the present example embodiment.

In addition, the projection unit 15 may project an image showing the number of products registered by the registration unit 13. Alternatively, the projection unit 15 may project an image showing the number of products recognized by the image analysis unit 12. FIG. 7 shows an example of such an image.

In FIG. 7, an image 7-2 indicating the number of registered products (or recognized products) is projected on the placement surface of the placement platform 2. The illustrated image 7-2 shows the numeral "2". Note that, in this example, the image 7-1 described above is also projected.

The projection unit 15 may determine the position at which the image 7-2 is projected by using the "position information of the position on which no product is placed" received from the image analysis unit 12.

For example, the projection unit 15 retains a conversion rule (for example: a conversion expression composed of matrices, or the like) for converting the coordinates in the image into the coordinates in the projection area in advance. Then, based on the conversion rule, the projection unit 15 converts the "coordinates in the image at the position where the product is not placed" into the coordinates in the projection area. Then, the projection unit 15 determines the converted coordinates in the projection area as the position to project the image 7-2.

Figure 8:
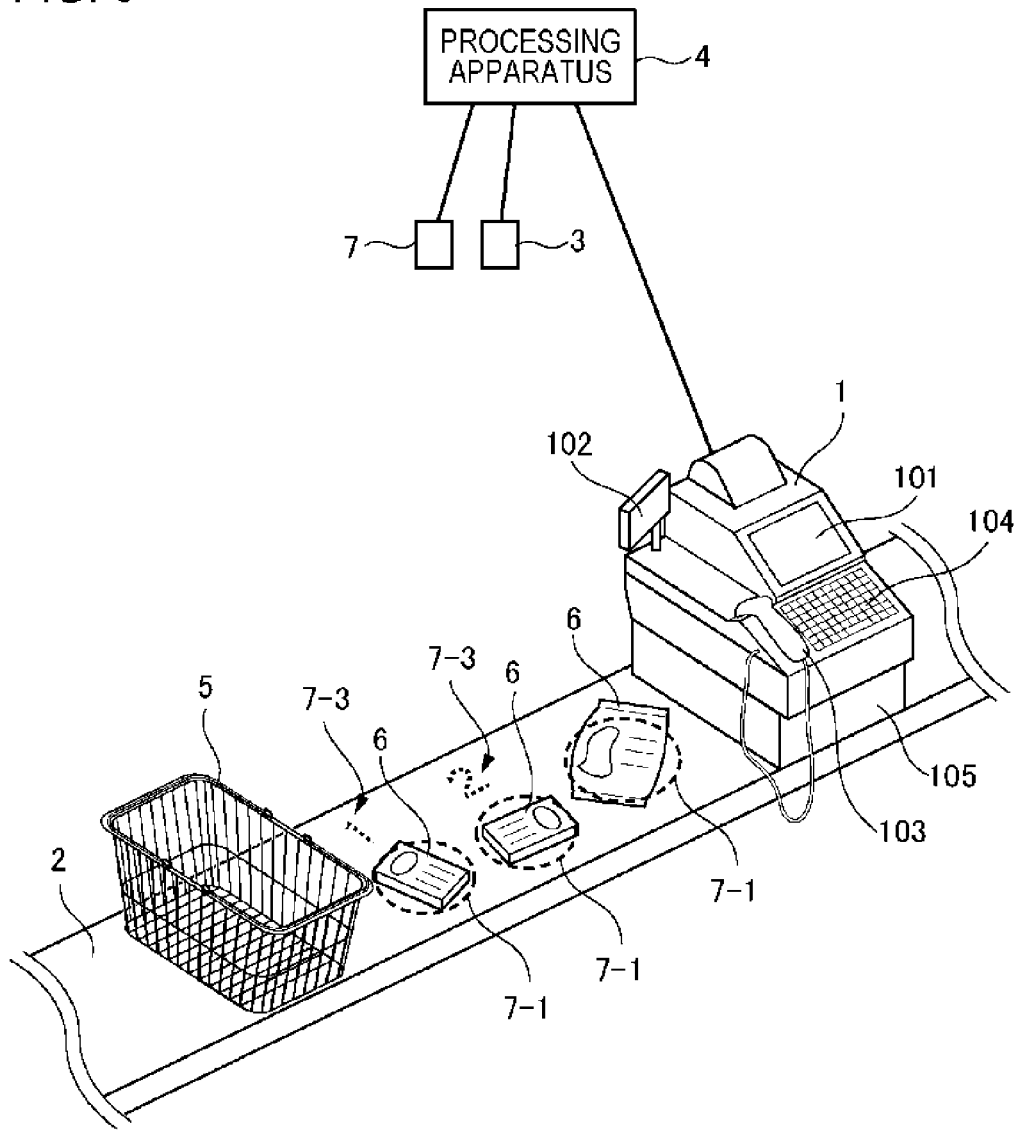
FIG. 8 is a diagram for explaining still another example of the image projected by the projection unit of the present example embodiment.

In addition, in a case where two or more same products are registered by the registration unit 13, the projection unit 15 may project an image showing the fact. FIG. 8 shows an example of such an image.

In FIG. 8, serial numbers (images 7-3) are projected corresponding to the two same registered products 6, respectively. In this example, the worker can also recognize that two or more same products 6 are registered and which products 6 they are as well.

The projection unit 15 may determine the projection position of the image 7-3 in the same manner as the projection position of the image 7-1.

Figure 9:
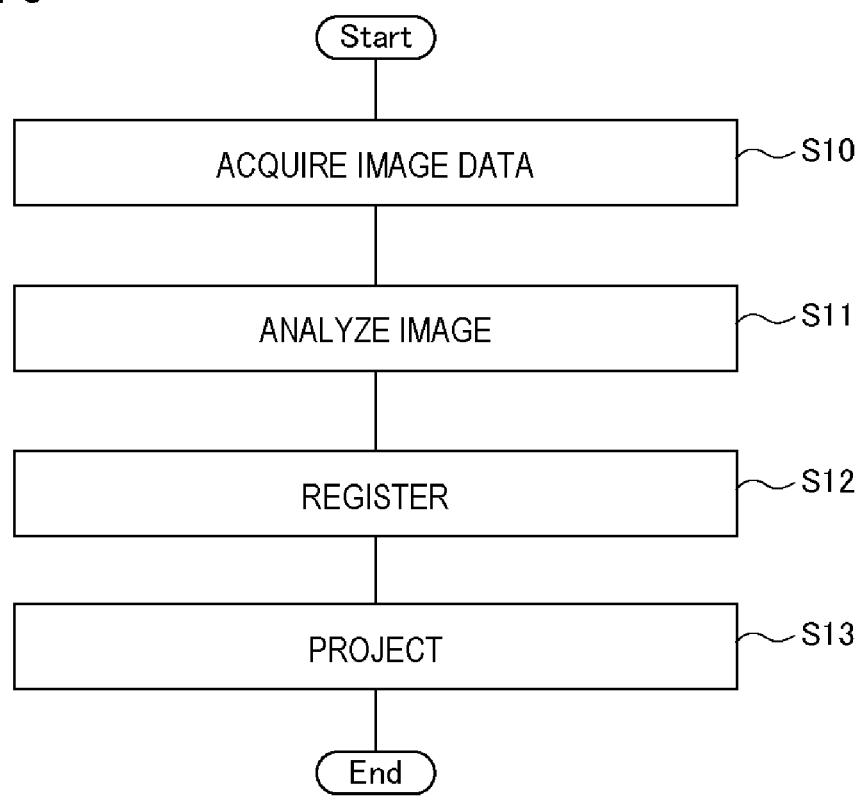
FIG. 9 is a flowchart showing an example of a process flow of the checkout apparatus of the present example embodiment.

Next, an example of the process flow of the checkout apparatus 10 of the present example embodiment will be described with reference to the flowchart of FIG. 9.

In S10, the image data acquisition unit 11 acquires data on an image captured so as to include the placement surface of the placement platform on which the product to be checked out is placed.

In S11, the image analysis unit 12 recognizes one or a plurality of products captured in the image, by using the feature value storage unit in which the feature value of the appearance of each of the plurality of products are registered in advance and the image data.

In S12, the registration unit 13 registers the one or plurality of products recognized by the image analysis unit 12 as products to be checked out.

In S13, in response to registration by the registration unit 13 or recognition by the image analysis unit 12, the projection unit 15 projects the images (refer to the images 7-1 to 7-3 in FIGS. 6 to 8) on the placement surface and/or the product.

According to the present example embodiment described above, the same advantageous effects as those of the first example embodiment can be realized. Since the information related to registration by the registration unit 13 or the information related to recognition by the image analysis unit 12 can be projected on the placement surface and/or the product, the worker who performs registration work can check these types of information, while performing predetermined work on the product placed on the placement platform (for example, work of arranging a plurality of products on the placement platform so that products do not overlap each other, and work of adjusting the way (orientation or the like) of placing each product so that a characteristic portion of the product is imaged).

For example, as illustrated in FIG. 6, in a case where the image 7-1 for specifying the registered product 6 is projected, the worker performing the registration work views the image 7-1 while performing the predetermined work, which makes it possible to easily discriminate between the product 6 for which registration has been normally completed and the product 6 for which registration has not been normally completed. Then, appropriate measures can be taken according to the discrimination result. For example, the product 6 for which registration has been normally completed is put in a bag. Then, it is possible to adjust the placement position, orientation, or the like of the product 6 for which registration has not been normally completed, and to cause the recognition process to be performed again. In addition, product information may be read individually using the code reader 103 only for the products 6 whose registration has not been normally completed.

As another example, as illustrated in FIG. 6, in a case where the image 7-1 for specifying the recognized product 6 is projected, the worker performing the registration work views the image 7-1 while performing the predetermined work, which makes it possible to easily discriminate between the product 6 for which recognition has been normally completed and the product 6 for which recognition has not been normally completed. Then, appropriate measures can be taken according to the discrimination result. For example, it is possible to adjust the placement position, orientation, or the like of the product 6 for which recognition has not been normally completed, and to perform the recognition process again. In addition, product information may be read individually using the code reader 103 only for the products 6 that are not normally recognized.

As another example, as illustrated in FIG. 7, in a case where an image showing the number of registered products 6 is projected, the worker performing the registration work views the image 7-2 while performing the predetermined work, which makes it possible to easily recognize the number of products 6 for which registration has been normally completed. Then, it is possible to take appropriate measures based on the recognized contents. For example, it is possible to detect missed registration, double registration, or the like by counting the number of products 6 to be checked out while checking the products with eyes and comparing the result with the number known from the image 7-2.

As another example, as illustrated in FIG. 7, in a case where an image showing the number of recognized products 6 is projected, the worker performing the registration work views the image 7-2 while performing the predetermined work, which makes it possible to easily recognize the number of normally recognized products 6. Then, it is possible to take appropriate measures based on the recognized contents. For example, it is possible to detect missed registration, or the like by counting the number of products 6 to be checked out while checking the products with eyes and comparing the result with the number known from the image 7-2.

As another example, as illustrated in FIG. 8, in a case where an image 7-3 indicating that two or more same products 6 are registered is projected, the worker performing the registration work views the image 7-3 while performing the predetermined work, which makes it possible to easily recognize the fact. Thus, it is possible to easily recognize that a plurality of same products 6 are normally registered without omission. Further, it is possible to take appropriate measures based on the recognized contents. For example, by checking the products 6 with eyes, it is possible to detect a registration mistake in which different products 6 having similar appearance are registered as the same products 6.

Third Example Embodiment

The checkout apparatus 10 according to the present example embodiment can project images related to the guidance of a checkout process on the placement surface of the placement platform. This will be described in detail below.

An example of the functional block diagram of the checkout apparatus 10 of the present example embodiment is illustrated in FIG. 3 as in the first and second example embodiments. As illustrated, the checkout apparatus 10 includes an image data acquisition unit 11, an image analysis unit 12, a registration unit 13, a feature value storage unit 14, and a projection unit 15.

Note that, as in the first and second example embodiments, the checkout apparatus 10 may not include the feature value storage unit 14. The premise in this case is the same as in the first and second example embodiments. Further, the checkout apparatus 10 may or may not include a product information storage unit, as in the first and second example embodiments. The premise in the case without the product information storage unit is the same as in the first and second example embodiments.

The configurations of the image data acquisition unit 11, the image analysis unit 12, the registration unit 13, the feature value storage unit 14, and the product information storage unit are the same as those in the first and second example embodiments.

The projection unit 15 projects an image related to guidance for a checkout process. Other configurations of the projection unit 15 are the same as those in the first and second example embodiments.

Figure 10:
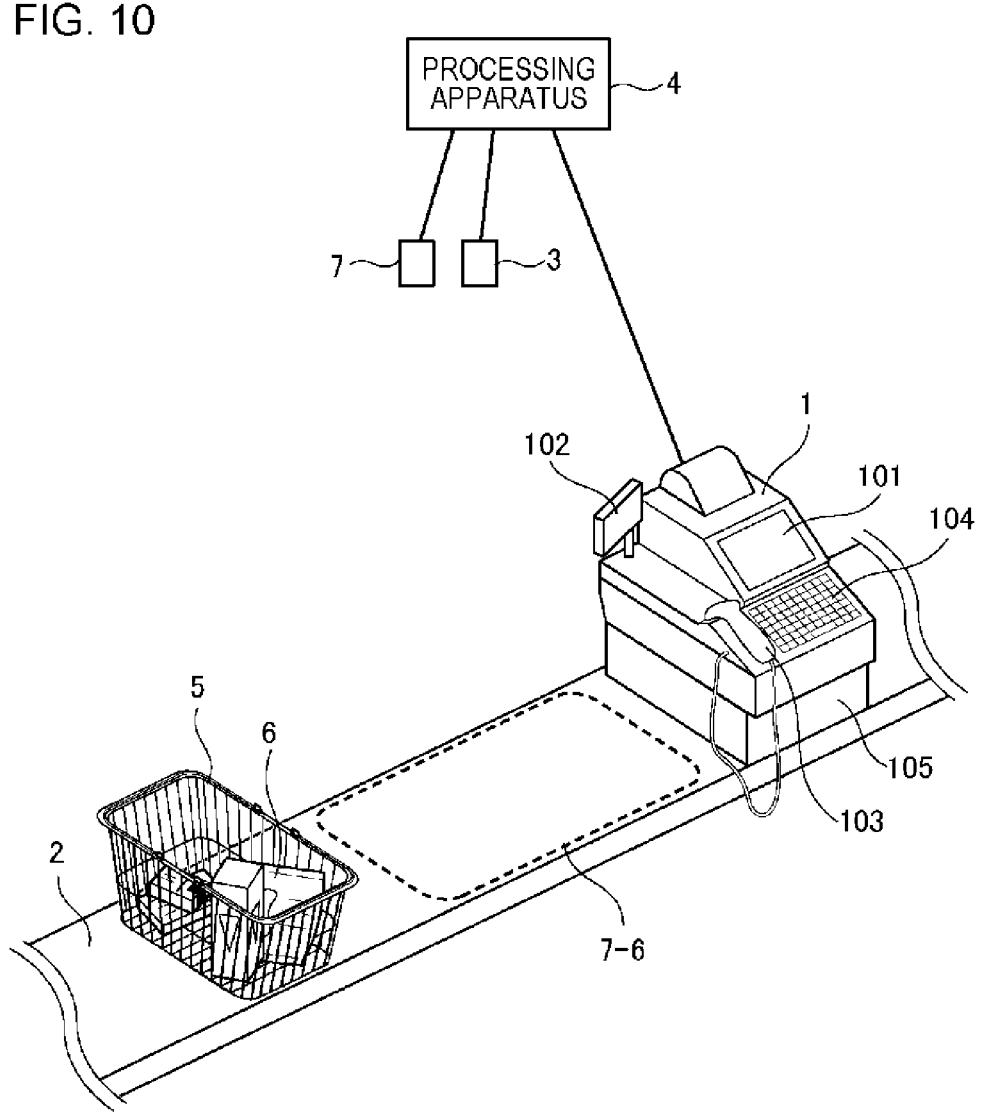
FIG. 10 is a diagram for explaining still another example of the image projected by the projection unit of the present example embodiment.

For example, as illustrated in FIG. 10, the projection unit 15 may project the image 7-6 indicating the area where the product 6 is placed. Thus, the worker performing the registration work can easily recognize the area to place the product 6 in order to register the product 6 using the image recognition technique.

It should be noted that, in addition, the projection unit 15 may also display an image showing explanation or the like for a work of the checkout process by character information. For example, on the placement platform 2, explanation for a work such as "Please place products side by side not to overlap each other so that the main surfaces of the products face up. Products are registered using an image recognition technique." may also be displayed. Such guidance information is useful in a case where workers who are not familiar with the registration work, such as shoppers, perform the registration work.

In addition, the projection unit 15 may guide the way of placing the product (for example, keep it stand, lay it down, or the like) by projecting the silhouette of the product. In addition, the projection unit 15 may guide the way of placing the product by a moving image. For example, it may be possible to project a moving image obtained by capturing a state in which a tubular product is laid down or a characteristic portion of a product is placed upward.

In addition, in a case where a plurality of imaging apparatuses 3 are installed, the projection unit 15 may guide a preferred way of disposing products under the environment. For example, guidance for placing the tubular product 6 in the vicinity of the imaging apparatus 3 positioned on the placement surface of the placement platform 2 and capturing an image from the lateral direction may be realized by the silhouette image or the moving image. In addition, guidance for placing the tubular product 6 on the approximate center of the placement surface to be captured by the imaging apparatus 3 capturing an image from the upward direction may be realized by the silhouette image or the moving image. In addition, guidance for placing the plurality of products 6 so as not to be shadowed by each other may be realized by the moving image.

Figure 11:
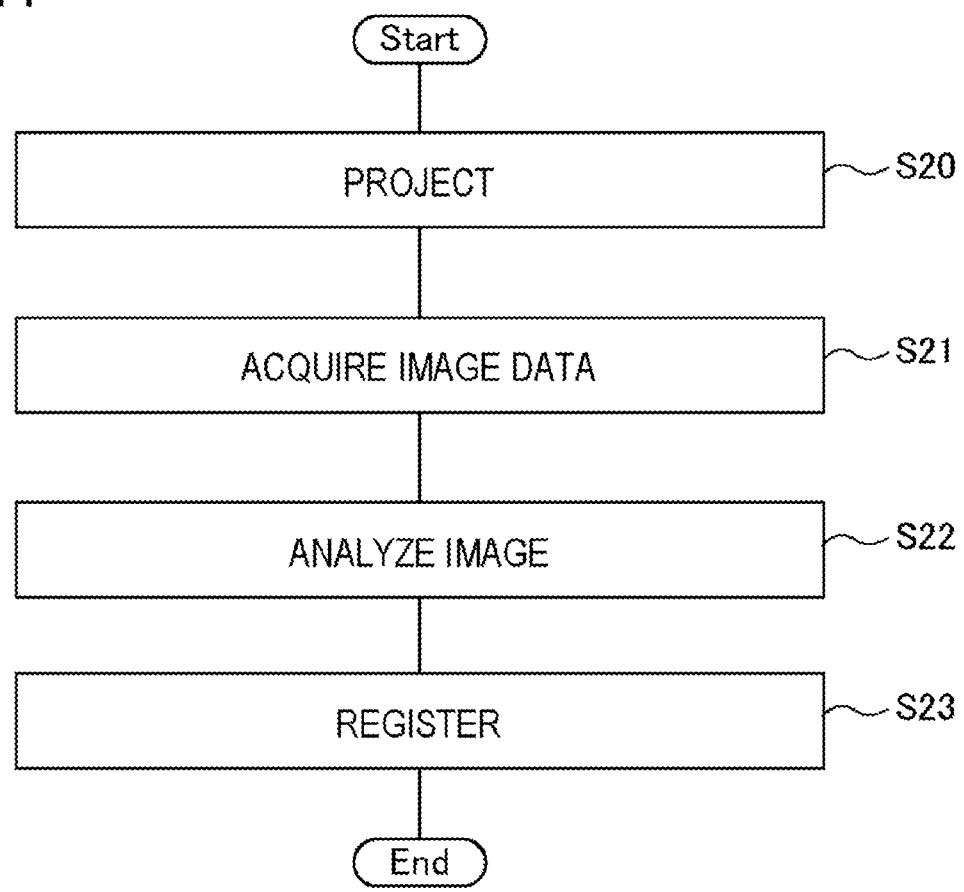
FIG. 11 is a flowchart showing an example of a process flow of the checkout apparatus of the present example embodiment.

Next, an example of the process flow of the checkout apparatus 10 of the present example embodiment will be described with reference to the flowchart of FIG. 11.

In S20, the projection unit 15 projects an image related to the guidance for the checkout process on the placement surface.

In S21, the image data acquisition unit 11 acquires data on an image captured so as to include the placement surface of the placement platform on which the product to be checked out is placed.

In S22, the image analysis unit 12 recognizes one or a plurality of products captured in the image, by using the feature value storage unit in which the feature value of the appearance of each of the plurality of products is registered in advance and the image data.

In S23, the registration unit 13 registers the one or plurality of products recognized by the image analysis unit 12 as products to be checked out.

After S23, the projection unit 15 may project the image related to the registration on the placement surface and/or the product in accordance with the registration by the registration unit 13.

According to the present example embodiment described above, the same advantageous effects as those of the first and second example embodiments can be realized. Further, according to the present example embodiment, it is possible to project images related to the guidance for the checkout process. A worker who is not familiar with the work of registering a product by image recognition as in the present example embodiment is supposed to be confused at the beginning. As in the present example embodiment, by projecting the image related to the guidance for the checkout process, it is possible to reduce the inconvenience.

Further, as an example, as illustrated in FIG. 10, it is possible to indicate the area where the product 6 is placed on the placement surface of the placement platform 2 by using the image 7-6, so that the worker can easily recognize the area without misunderstanding.

Fourth Example Embodiment

The checkout apparatus 10 according to the present example embodiment can project images related to warnings about a checkout process on the placement surface of the placement platform and/or on the product. This will be described in detail below.

An example of the functional block diagram of the checkout apparatus 10 of the present example embodiment is illustrated in FIG. 3 as in the first to third example embodiments. As illustrated, the checkout apparatus 10 includes an image data acquisition unit 11, an image analysis unit 12, a registration unit 13, a feature value storage unit 14, and a projection unit 15.

It should be noted that, as in the first to third example embodiments, the checkout apparatus 10 may not include the feature value storage unit 14. The premise in this case is the same as in the first to third example embodiments. Further, the checkout apparatus 10 may or may not include a product information storage unit, as in the first to third example embodiments.

The premise in the case without the product information storage unit is the same as in the first to third example embodiments.

The configurations of the image data acquisition unit 11, the registration unit 13, the feature value storage unit 14, and the product information storage unit are the same as those in the first to third example embodiments.

After extracting objects captured in the image, the image analysis unit 12 recognizes the product by using the appearance feature of each of the extracted objects and the information registered in the feature value storage unit 14. The technique of extracting objects is a matter of design. For example, the image analysis unit 12 detects the outline of the object from the image, and extracts the object based on the detected outline.

Then, the image analysis unit 12 performs product recognition, based on the matching degree (similarity) between the appearance feature of each of the extracted objects and the feature value of each of the plurality of products registered in the feature value storage unit 14. In a case where the appearance feature of a certain object is similar to the feature value of the appearance of a certain product by a predetermined level or more, the image analysis unit 12 recognizes the object as the product.

The image analysis unit 12 acquires position information for each extracted object. For example, the image analysis unit 12 acquires the coordinates in the image of each of the extracted objects. Then, the image analysis unit 12 transmits to the projection unit 15, the position information of each of the objects that cannot be recognized as a product (objects which are not similar to the feature value of any product by more than a predetermined level).

Other configurations of the image analysis unit 12 are the same as those in the first to third example embodiments.

Figure 12:
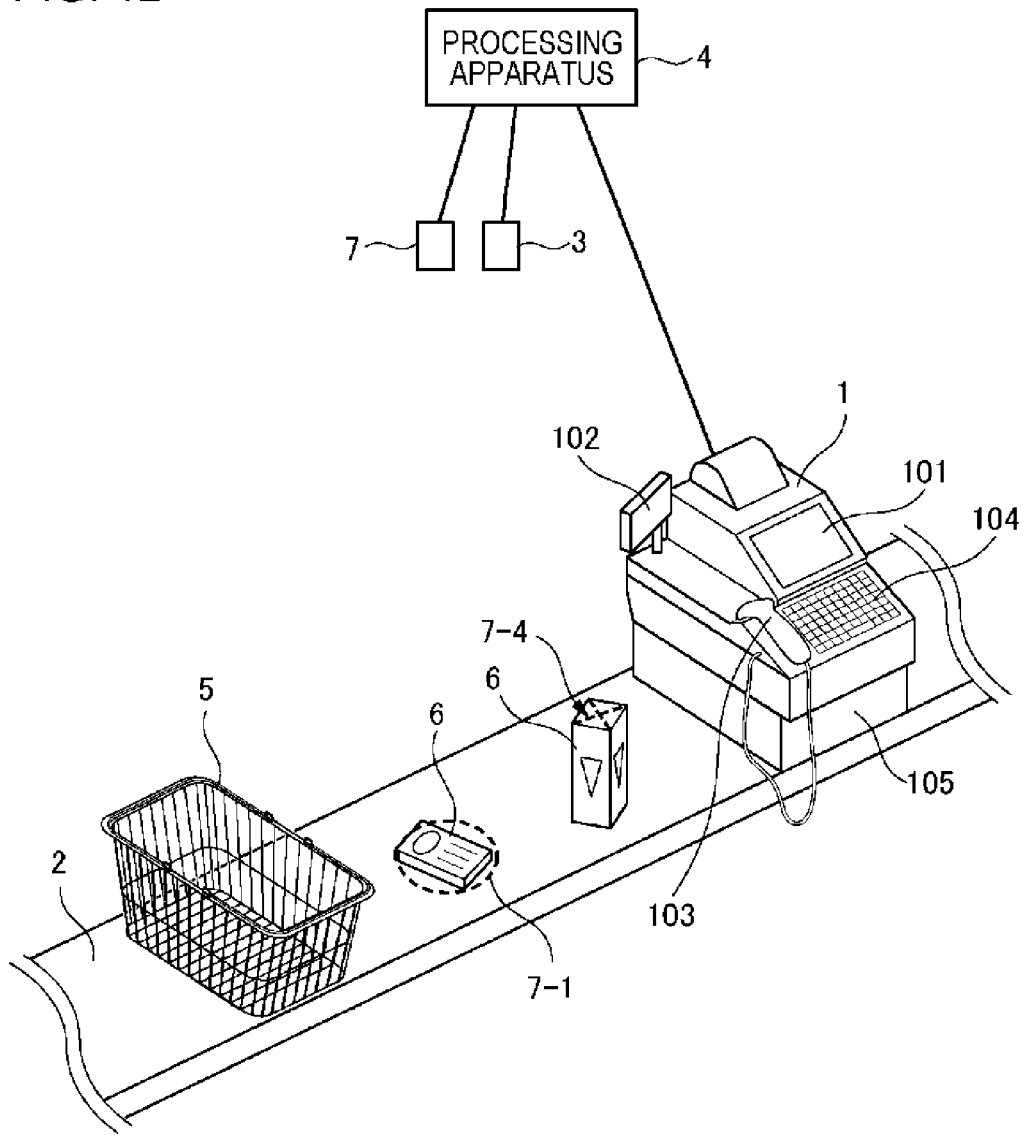
FIG. 12 is a diagram for explaining still another example of the image projected by the projection unit of the present example embodiment.

The projection unit 15 projects an image for specifying an object that is not recognized as a product. Other configurations of the projection unit 15 are the same as those in the first to third example embodiments. For example, as illustrated in FIG. 12, the projection unit 15 may project an image 7-4 specifying an object that is not recognized as a product 6. Note that, although the FIG. 12 shows the image 7-4 of an X mark, this mark is only an example.

Further, in this example, an image 7-1 for specifying the registered product 6 is also displayed. The image 7-1 is a circle mark and the image 7-4 is an X mark. Even in the case of projecting a plurality of pieces of information, confusion can be avoided by making the shapes, colors, or the like of marks different.

An example of the processing flow of the checkout apparatus 10 of the present example embodiment is the same as that in the first to third example embodiments.

According to the present example embodiment described above, the same advantageous effects as those of the first to third example embodiments can be realized. Further, according to the present example embodiment, it is possible to project an image showing a warning about the checkout process on the placement surface of the placement platform or on the product.

In the case of the checkout apparatus 10 of the present example embodiment, the worker who performs the registration work can view images related to the warning projected on the placement surface of the placement platform or on the product, while performing predetermined work on the product placed on the placement platform (for example, arranging a plurality of products on the placement platform so that products do not overlap each other, and adjusting the way (orientation or the like) of placing each product so that a characteristic portion of the product is imaged). As a result, inconvenience of overlooking warnings during the above work can be alleviated.

Further, according to the present example embodiment, as illustrated in FIG. 12, it is possible to project the image 7-4 specifying an object that is not recognized as the product 6. For example, the product which is not registered in the feature value storage unit 14 or the product information storage unit, the product of which information (appearance) included in the image is insufficient because the way of placement is not preferable and which is not recognized as the product 6, or the like is specified by the image 7-4 as an object which is not recognized as the product 6.

A worker who views the image 7-4 can perform appropriate work such as adjusting the placement position, orientation, or the like of the product 6, or reading the product information on only the product 6 individually using the code reader 103. Further, in a case where the product which is not registered in the feature value storage unit 14 or the product information storage unit, for example, a shopper's belongings (for example, a mobile phone or the like) is placed on the placement surface, the image 7-4 is viewed, and thus it is possible to easily recognize that there is no inconvenience that the object is incorrectly recognized as the product 6 and registered.

Fifth Example Embodiment

The checkout apparatus 10 of the present example embodiment can project an image related to warnings about a checkout process, which is different from that in the fourth example embodiment, on the placement surface of the placement platform and/or on the product. This will be described in detail below.

Figure 13:
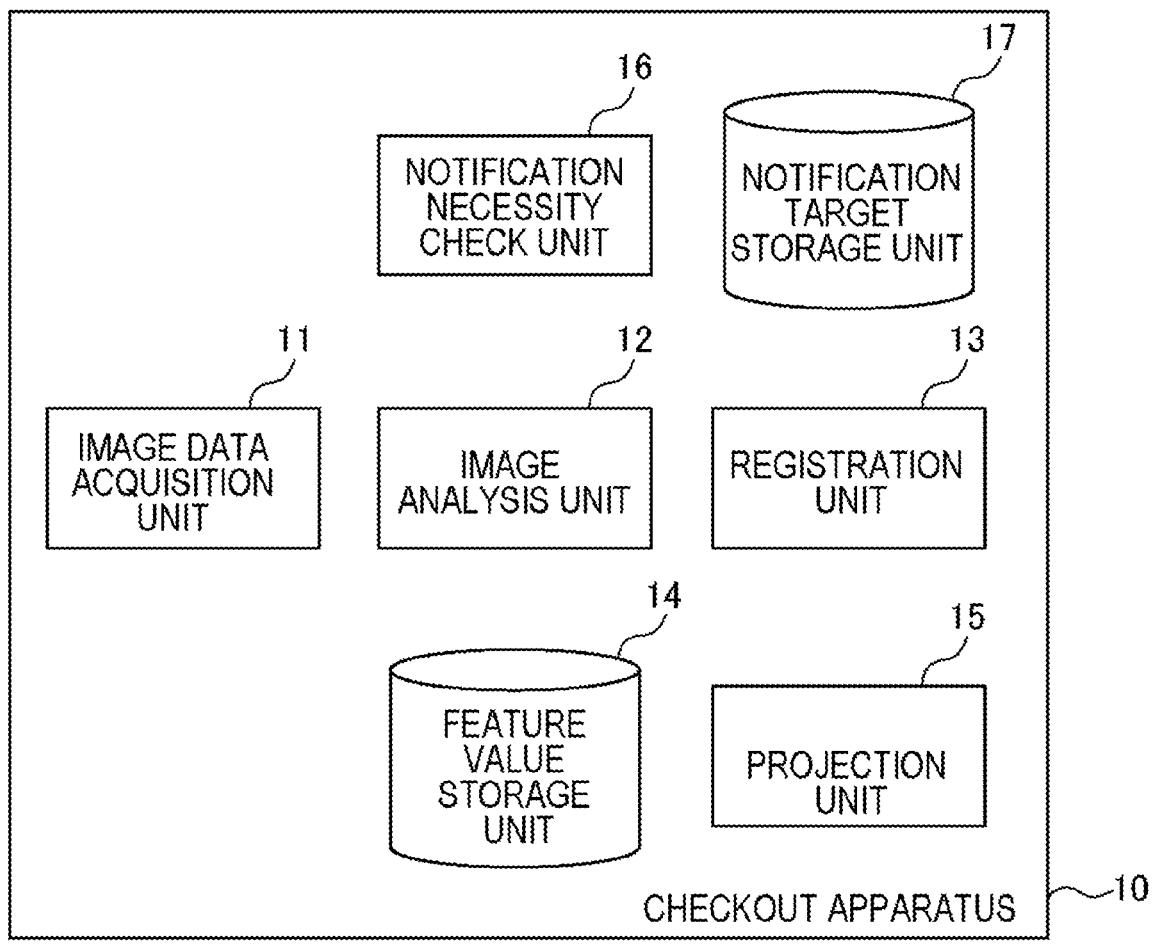
FIG. 13 is an example of a functional block diagram of the checkout apparatus of the present example embodiment.

An example of the functional block diagram of the checkout apparatus 10 of the present example embodiment is illustrated in FIG. 13. As illustrated, the checkout apparatus 10 includes an image data acquisition unit 11, an image analysis unit 12, a registration unit 13, a feature value storage unit 14, a projection unit 15, a notification necessity check unit 16, and a notification target storage unit 17.

As described in the first example embodiment, the checkout apparatus 10 includes the registration apparatus 1, the processing apparatus 4 and the projection apparatus 7 illustrated in FIG. 2. The image data acquisition unit 11 is configured by the processing apparatus 4. The image analysis unit 12 is configured by the processing apparatus 4. The registration unit 13 is configured by the registration apparatus 1. The feature value storage unit 14 may be configured by the processing apparatus 4. The projection unit 15 is configured by the processing apparatus 4 and the projection apparatus 7. The notification necessity check unit 16 is configured by the processing apparatus 4. The notification target storage unit 17 may be configured by the processing apparatus 4.

It should be noted that, as in the first to fourth example embodiments, the checkout apparatus 10 may not include the feature value storage unit 14. The premise in this case is the same as in the first to fourth example embodiments. Further, the checkout apparatus 10 may or may not include a product information storage unit, as in the first to fourth example embodiments. The premise in the case without the product information storage unit is the same as in the first to fourth example embodiments. Further, the checkout apparatus 10 may not include the notification target storage unit 17. In this case, a different apparatus logically separated from the checkout apparatus 10 is provided with the notification target storage unit 17. The checkout apparatus 10 is configured to communicate with the different apparatus so as to acquire the information stored in the notification target storage unit 17.

The configurations of the image data acquisition unit 11, the image analysis unit 12, the registration unit 13, the feature value storage unit 14, and the product information storage unit are the same as those in the first to fourth example embodiments.

In the case where the product is included in the checkout target, the notification necessity check unit 16 checks whether or not a product requiring notification is included in the products recognized by the image analysis unit 12, using the notification target storage unit 17 in which products requiring notification are registered in advance.

For example, the notification target storage unit 17 may store information for specifying a product requiring age verification at the time of sale. Then, the notification necessity check unit 16 may check whether or not a product requiring age verification is included in the products recognized by the image analysis unit 12, using the information. In this case, the product requiring age verification is the product to be notified.

In addition, the notification target storage unit 17 may store information for specifying a target product of a service for giving a predetermined prize to a purchaser. Then, the notification necessity check unit 16 may check whether or not a product for which a prize is to be given is included in the products recognized by the image analysis unit 12, using the information. In this case, the product for which a prize is to be given is the product to be notified.

It should be noted that, the notification targets exemplified here are only examples, and other notification targets may be used.

Figure 14:
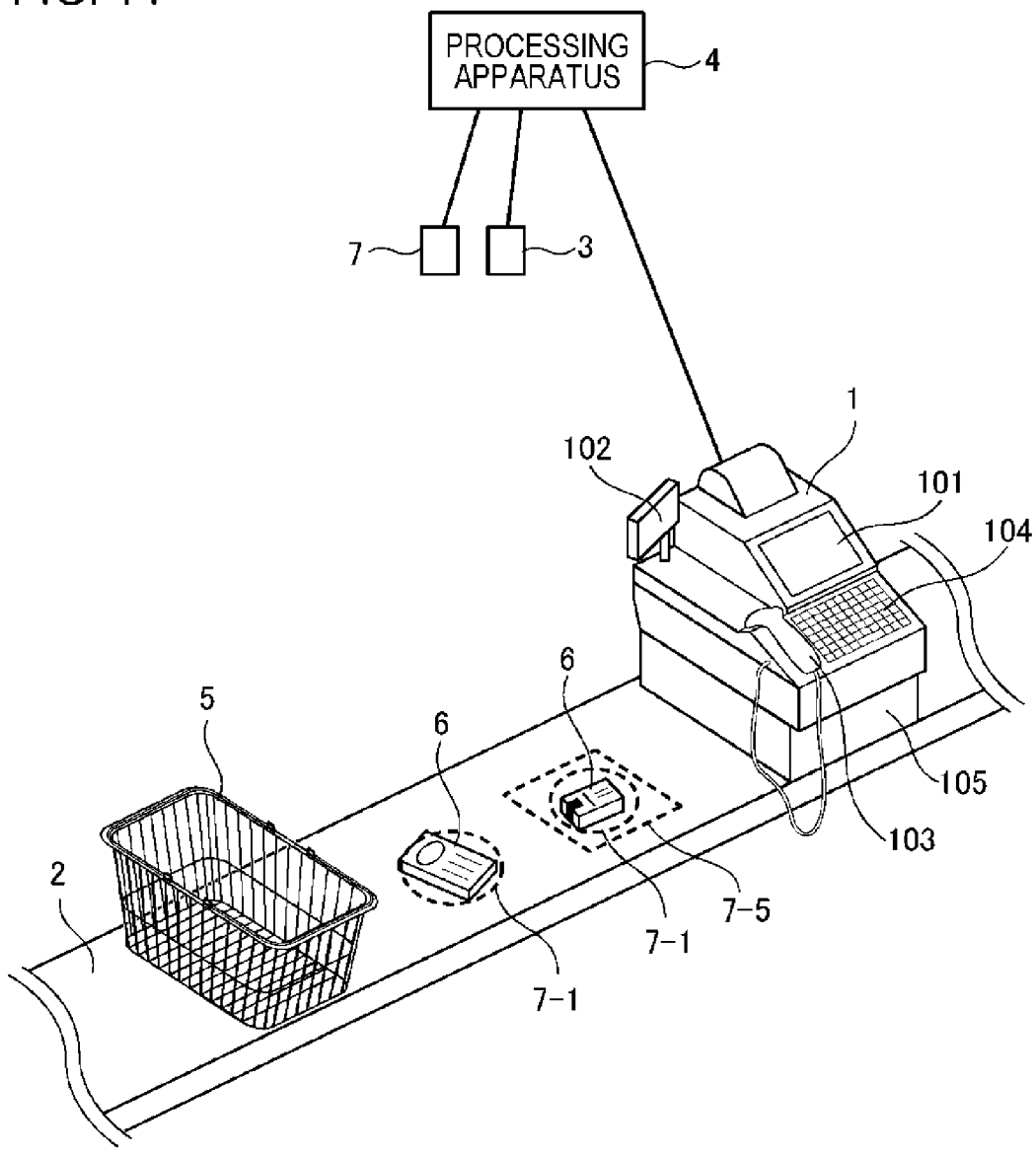
FIG. 14 is a diagram for explaining still another example of the image projected by the projection unit of the present example embodiment.

The projection unit 15 projects an image for specifying a product requiring notification. Other configurations of the projection unit 15 are the same as those in the first to fourth example embodiments. For example, as illustrated in FIG. 14, the projection unit 15 may project an image 7-5 specifying the product 6 to be notified. Note that, although the FIG. 14 shows the image 7-4 of a square mark, this mark is only an example.

In this example, an image 7-1 for specifying the registered product 6 is also displayed. The image 7-1 is a circle mark and an image 7-4 is a square mark. Even in the case of projecting a plurality of pieces of information, confusion can be avoided by making the shapes, colors, or the like of marks different.

An example of the processing flow of the checkout apparatus 10 of the present example embodiment is the same as that in the first to fourth example embodiments.

According to the present example embodiment described above, the same advantageous effects as those of the first to fourth example embodiments can be realized. Further, according to the present example embodiment, it is possible to project an image for specifying a product requiring notification.

In the case of the checkout apparatus 10 of the present example embodiment, the worker who performs the registration work views the images, while performing predetermined work on the product placed on the placement platform (for example, arranging a plurality of products on the placement platform so that products do not overlap each other, and adjusting the way (orientation or the like) of placing each product so that a characteristic portion of the product is imaged), so it is possible to easily recognize the notification about a predetermined product. Then, according to the contents of the notification, an appropriate process such as age verification and giving prize can be performed. As a result, it is possible to reduce the process omission caused by overlooking that the product to be subjected to such a process is included in the checkout target.

Examples of a reference aspect will be added below.

1. An information processing apparatus including:

an image data acquisition unit which acquires data on an image;

an image analysis unit which recognizes a product in the image, using a feature value of appearance of each of a plurality of products registered in a feature value storage unit and the data on the image;

a registration unit which registers the product recognized by the image analysis unit as a checkout target; and a projection unit which projects an image related to a checkout process, on the product and/or a placement surface of a placement platform for the product.

2. The information processing apparatus according to 1, wherein the projection unit projects an image related to registration by the registration unit or recognition by the image analysis unit.

3. The information processing apparatus according to 2, wherein the projection unit projects an image for specifying the product registered by the registration unit or an image for specifying the product recognized by the image analysis unit.

4. The information processing apparatus according to 2 or 3, wherein the projection unit projects an image showing the number of products registered by the registration unit or an image showing the number of products recognized by the image analysis unit.

5. The information processing apparatus according to any one of 2 to 4, wherein the projection unit projects an image showing that two or more same products are registered by the registration unit.

6. The information processing apparatus according to any one of 1 to 5, wherein the projection unit projects an image related to guidance for the checkout process.

7. The information processing apparatus according to 6, wherein the projection unit projects an image showing an area where the product is placed.

8. The information processing apparatus according to any one of 1 to 7, wherein the projection unit projects an image showing a warning about the checkout process.

9. The information processing apparatus according to 8, wherein after extracting objects captured in the image, the image analysis unit recognizes the product by using an appearance feature of each of the extracted objects and information registered in the feature value storage unit, and wherein the projection unit projects an image for specifying the object which is not recognized as the product.

10. The information processing apparatus according to 8 or 9, further including:

a notification necessity check unit that checks whether or not the product requiring notification is included in the products recognized by the image analysis unit, using a notification target storage unit in which the product requiring notification is registered in advance, in a case where the product is included in the checkout target, wherein the projection unit projects an image for specifying the product requiring notification.

11. The information processing apparatus according to any one of 1 to 10, wherein the registration unit acquires product information on one or the plurality of products recognized by the image analysis unit by using a product information storage unit in which the product information on each of the plurality of products is registered in advance, and registers the acquired product information.

12. An information processing method executed by a computer, the method including:

an image data acquisition step of acquiring data on an image;

an image analysis step of recognizing a product in the image, using a feature value of appearance of each of a plurality of products registered in a feature value storage unit and the data on the image;

a registration step of registering the product recognized in the image analysis step as a checkout target; and a projection step of projecting an image related to a checkout process, on the product and/or a placement surface of a placement platform for the product.

12-2. The information processing method according to 12, wherein in the projection step, an image related to registration in the registration step or recognition in the image analysis step is projected.

12-3. The information processing method according to 12-2, wherein in the projection step, an image for specifying the product registered in the registration step or an image for specifying the product recognized in the image analysis step is projected.

12-4. The information processing method according to 12-2 or 12-3, wherein in the projection step, an image showing the number of products registered in the registration step or an image showing the number of products recognized in the image analysis step.

12-5. The information processing method according to any one of 12-2 to 12-4, wherein in the projection step, an image showing that two or more same products are registered in the registration step.

12-6. The information processing method according to any one of 12 to 12-5, wherein in the projection step, an image related to guidance for the checkout process is projected.

12-7. The information processing method according to 12-6, wherein in the projection step, an image showing an area where the product is placed is projected.

12-8. The information processing method according to any one of 12 to 12-7, wherein in the projection step, an image showing a warning about the checkout process is projected.

12-9. The information processing method according to 12-8, wherein in the image analysis step, after objects captured in the image are extracted, the product is recognized by using an appearance feature of each of the extracted objects and information registered in the feature value storage unit, and wherein in the projection step, an image for specifying the object which is not recognized as the product is projected.

12-10. The information processing method according to 12-8 or 12-9, further causing the computer to execute a notification necessity check step of checking whether or not the product requiring notification is included in the products recognized in the image analysis step, using a notification target storage unit in which the product requiring notification is registered in advance, in a case where the product is included in the checkout target, wherein in the projection step, an image for specifying the product requiring notification is projected.

12-11. The information processing method according to any one of 12 to 12-10, wherein in the registration step, product information on one or the plurality of products recognized by the image analysis unit is acquired by using a product information storage unit in which the product information on each of the plurality of products is registered in advance, and the acquired product information is registered.

13. A program causing a computer to function as:
an image data acquisition unit which acquires data on an image;
an image analysis unit which recognizes a product in the image, using a feature value of appearance of each of a plurality of products registered in a feature value storage unit and the data on the image;
a registration unit which registers the product recognized by the image analysis unit as a checkout target; and
a projection unit which projects an image related to a checkout process on the product and/or a placement surface of a placement platform for the product.

13-2. The program according to 13,
wherein the projection unit projects an image related to registration by the registration unit or recognition by the image analysis unit.

13-3. The program according to 13-2,
wherein the projection unit projects an image for specifying the product registered by the registration unit or an image for specifying the product recognized by the image analysis unit.

13-4. The program according to 13-2 or 13-3,
wherein the projection unit projects an image showing the number of products registered by the registration unit or an image showing the number of products recognized by the image analysis unit.

13-5. The program according to any one of 13-2 to 13-4,
wherein the projection unit projects an image showing that two or more same products are registered by the registration unit.

13-6. The program according to any one of 13 to 13-5,
wherein the projection unit projects an image related to guidance for the checkout process.

13-7. The program according to 13-6,
wherein the projection unit projects an image showing an area where the product is placed.

13-8. The program according to any one of 13 to 13-7,
wherein the projection unit projects an image showing a warning about the checkout process.

13-9. The program according to 13-8,
wherein after extracting objects captured in the image, the image analysis unit recognizes the product by using an appearance feature of each of the extracted objects and information registered in the feature value storage unit, and
wherein the projection unit projects an image for specifying the object which is not recognized as the product.

13-10. The program according to 13-8 or 13-9, further causing the computer to function as:
a notification necessity check unit that checks whether or not the product requiring notification is included in the products recognized by the image analysis unit, using a notification target storage unit in which the product requiring notification is registered in advance, in a case where the product is included in the checkout target,
wherein the projection unit projects an image for specifying the product requiring notification.

13-11. The program according to any one of 13 to 13-10,
wherein the registration unit acquires product information on one or the plurality of products recognized by the image analysis unit by using a product information storage unit in which the product information on each of the plurality of products is registered in advance, and registers the acquired product information.

This application claims priority based on Japanese Patent Application No. 2016-009601 filed on Jan. 21, 2016, and the disclosure of which is incorporated herein in its entirety.

The invention claimed is:

1. An information processing apparatus comprising:
at least one memory storing one or more instructions; and
at least one processor configured to execute the one or more instructions to:
recognize a plurality of products by using an acquired image;
register the plurality of products as a checkout target; and
output information related to the checkout target on one of the plurality of products.

2. The information processing apparatus according to claim 1, wherein the at least one processor is configured to:
output an image related to at least one of registration and recognition.

3. The information processing apparatus according to claim 2, wherein the at least one processor is configured to:
output at least one of an image for specifying a registered product and an image for specifying a recognized product.

4. The information processing apparatus according to claim 2, wherein the at least one processor is configured to:
output at least one of an image showing a number of the registered products and an image showing a number of the recognized products.

5. The information processing apparatus according to claim 1, wherein the at least one processor is configured to:
project an image related to guidance for a checkout process.

6. The information processing apparatus according to claim 5, wherein the at least one processor is configured to:
project an image showing an area where one of the plurality of products is placed.

7. The information processing apparatus according to claim 1, wherein the at least one processor is configured to:
project an image showing a warning about a checkout process.

8. The information processing apparatus according to claim 7, wherein the at least one processor is configured to:
recognize one of the plurality of products by using an appearance feature of each of the extracted objects and information registered in the memory, after extracting objects captured in the image, and
project an image for specifying an object which is not recognized as the product.

9. The information processing apparatus according to claim 7, wherein the at least one processor is configured to:
check whether or not a product requiring notification is included in the recognized products, using the memory in which the product requiring notification is registered in advance, in a case where the product is included in the checkout target, and
project an image for specifying the product requiring notification.

10. The information processing apparatus according to claim 1, wherein the at least one processor is configured to:
acquire product information on one of the plurality of recognized products by using the memory in which product information on each of the plurality of products is registered in advance, and
register the acquired product information.

11. The information processing apparatus according to claim 3, wherein the at least one processor is configured to:

output at least one of an image showing a number of the registered products and an image showing a number of the recognized products.

12. The information processing apparatus according to claim 2, wherein the at least one processor is configured to:
project an image related to guidance for a checkout process.

13. The information processing apparatus according to claim 3, wherein the at least one processor is configured to:
project an image related to guidance for a checkout process.

14. The information processing apparatus according to claim 4, wherein the at least one processor is configured to:
project an image related to guidance for a checkout process.

15. The information processing apparatus according to claim 2, wherein the at least one processor is configured to:
project an image showing a warning about a checkout process.

16. The information processing apparatus according to claim 3, wherein the at least one processor is configured to:
project an image showing a warning about a checkout process.

17. The information processing apparatus according to claim 4, wherein the at least one processor is configured to:
project an image showing a warning about a checkout process.

18. The information processing apparatus according to claim 5, wherein the at least one processor is configured to:
project an image showing a warning about a checkout process.

19. An information processing method causing a computer to:
recognize a plurality of products by using an acquired image;
register the plurality of products as a checkout target; and
output information related to the checkout target on one of the plurality of products.

20. A non-transitory storage medium storing a program causing a computer to:
recognize a plurality of products by using an acquired image;
register the plurality of products as a checkout target; and
output information related to the checkout target on one of the plurality of products.

* * * * *